United States Patent
Kumbhar et al.

(10) Patent No.: US 11,995,335 B2
(45) Date of Patent: May 28, 2024

(54) SYSTEM AND METHOD FOR DETERMINING AND UTILIZING AN EFFECTIVENESS OF LIFECYCLE MANAGEMENT FOR INTERACTIONS STORAGE, IN A CONTACT CENTER

(71) Applicant: inContact INC., Sandy, UT (US)

(72) Inventors: Balaji Kumbhar, Pune (IN); Harshit Sharma, Pune (IN); Seemit Shah, Pune (IN)

(73) Assignee: InContact INC.

( * ) Notice: Subject to any disclaimer, the term of this patent is extended or adjusted under 35 U.S.C. 154(b) by 239 days.

(21) Appl. No.: 17/316,752

(22) Filed: May 11, 2021

(65) Prior Publication Data
US 2022/0365701 A1 Nov. 17, 2022

(51) Int. Cl.
*G06F 3/06* (2006.01)

(52) U.S. Cl.
CPC .......... *G06F 3/0649* (2013.01); *G06F 3/0619* (2013.01); *G06F 3/0659* (2013.01); *G06F 3/067* (2013.01)

(58) Field of Classification Search
CPC .... G06F 3/0649; G06F 3/0619; G06F 3/0659; G06F 3/067
See application file for complete search history.

(56) References Cited

U.S. PATENT DOCUMENTS

| | | | |
|---|---|---|---|
| 7,958,093 B2* | 6/2011 | Anderson | G06F 3/0683 707/672 |
| 10,346,303 B1* | 7/2019 | Abrahms | G06F 12/0804 |
| 2006/0075007 A1* | 4/2006 | Anderson | G06F 3/0608 |
| 2015/0373166 A1* | 12/2015 | Anand | H04L 69/22 370/392 |
| 2016/0078045 A1* | 3/2016 | Ebsen | G06F 16/185 707/693 |
| 2020/0159421 A1* | 5/2020 | Karumbunathan | G06F 3/061 |

* cited by examiner

*Primary Examiner* — Eric T Loonan
(74) *Attorney, Agent, or Firm* — SOROKER AGMON NORDMAN RIBA (57) ABSTRACT

A computerized-method for determining and utilizing an effectiveness of lifecycle-management for storage of interactions-related objects, is provided herein. In a computerized system that is communicating with a multi-tier storage in a cloud-environment having a lifecycle-rules data-storage to store one or more lifecycle-rules, operating a Retention Effectiveness Calculation (REC) module. The operating of the REC module includes: (i) retrieving all lifecycle-rules from the lifecycle-rules data-storage; (ii) for each lifecycle-rule in the lifecycle rules data-storage calculating a Rule Effectiveness Score (RES); (iii) grouping all the calculated RES by media type; (iv) for each media type, calculating an Object Retention Score (ORS) for the media type; (v) dividing an aggregation of the ORS of all media types by a total number of media types to yield a total ORS for a contact-center; and (vi) displaying via a display unit the total ORS of the contact-center.

18 Claims, 8 Drawing Sheets

210 — Rule 1

| Rule 1 | |
|---|---|
| Media Type | Call Recording |
| Volume of interactions in active storage | 10000 |
| Volume of interactions accessed from the active storage | 2000 |
| Retention of interactions in Active storage as per lifecycle rule | 30 days |
| Average days within which interactions were accessed from Active storage | 20 days |
| Volume of interactions retrieved from the long-term storage | 1000 |
| Interaction Access Volume from Active Storage | 0.2 |
| Additional Interaction Retention in Active Storage | 0.67 |
| Lessen Interaction Retention in Active Storage | 0.9 |
| RES | 0.59 |

220 — Rule 2

| Rule 2 | |
|---|---|
| Media Type | Screen Recording |
| Volume of interactions in active storage | 5000 |
| Volume of interactions accessed from the active storage | 3000 |
| Retention of interactions in Active storage as per lifecycle rule | 20 days |
| Average days within which interactions were accessed from Active storage | 18 days |
| Volume of interactions retrieved from the long-term storage | 200 |
| Interaction Access Volume from Active Storage | 0.6 |
| Additional Interaction Retention in Active Storage | 0.9 |
| Lessen Interaction Retention in Active Storage | 0.96 |
| RES | 0.82 |

Figure 2

| Media Type | Call Recording |
|---|---|
| RES of Rule 1 | 0.671717172 |
| RES of Rule 2 | 0.680010893 |
| RES of Rule 3 | 0.574221515 |
| RES of Rule 4 | 0.566666667 |

| Interaction Volume | 900 |
|---|---|
| Untagged Volume | 70 |
| # of rules defined for Call Recording | 4 |

| ORS of Call Recording | 0.54 |
|---|---|

| Media Type | Screen Recording |
|---|---|
| RES of Rule 1 | 0.807692308 |
| RES of Rule 2 | 0.781196581 |

| Interaction Volume | 220 |
|---|---|
| Untagged Volume | 20 |
| # of rules defined for Call Recording | 2 |

| ORS of Screen Recording | 0.70 |
|---|---|

| ORS of Call Center | 0.62 |
|---|---|

Figure 3

| Data point | Description | Recommendation |
|---|---|---|
| 410 Interaction Access Volume from Active Storage | A low value of this data point indicates that access of the interactions that are linked to lifecycle is low | Lifecyle rule criteria should be changed to narrow down the interactions that are needed to be accessed in near future. |
| 420 Additional Interaction Retention in Active Storage | A low value of this data point indicates that the interactions are kept in the Active storage beyond their usage. | Number of days interactions should be kept in the Active storage should be reduced. |
| 430 Lessen Interaction Retention in Active Storage | A low value of this point indicates that the interactions are transitioned to long-term storage earlier than they are getting accessed | Number of days interactions should be kept in the Active storage should be increased. |
| 440 Life cycle rules has high RES but overall IRS at the contact center level is low | There are interactions that are not linked / processed by any of the life cycle rule. | New lifecycle rules should be created, or existing lifecycle rules should be modified to cover the interactions not being processed. |

SYSTEM AND METHOD FOR DETERMINING AND UTILIZING AN EFFECTIVENESS OF LIFECYCLE MANAGEMENT FOR INTERACTIONS STORAGE, IN A CONTACT CENTER

TECHNICAL FIELD

The present disclosure relates to the field of data analysis to determine and utilize an effectiveness of lifecycle management for short-term and long-term storage of interactions-related objects, in a contact center.

BACKGROUND

Lifecycle management of an object, such as short-term and long-term storage of an interactions-related object, is an integral part of a Contact Center as a Service (CCaaS) solution. In a CCaaS solution, customers define lifecycle rules to store objects related to the interactions, such as call recordings, screen recordings, video recordings, emails and chat transcripts, email attachments, and the like. Lifecycle management includes lifecycle configuration to control a time period when specific objects are deleted from the storage or transferred from active storage to archive.

Commonly, active storage facilitates uploading of files to a cloud storage service that is provided by cloud storage service providers, such as Amazon S3, Google Cloud storage, or Microsoft Azure storage and a web service interface is associated to the active storage to store and retrieve the data. For example, Amazon S3 operates a tiering storage that stores objects in four access tiers: two low latency access tiers for frequent and infrequent access, and two archive access tiers for rare access. In another example, Google cloud storage obtains a standard storage for data that is frequently accessed and/or stored for only brief periods of time, nearline storage, for storing infrequently accessed data, coldline storage and archive storage for long-term storage.

One or more objects may be obtained in a virtual storage, such as a bucket of objects. A lifecycle rule specifies either a delete action of one or more objects or a set a storage class action for one or more objects, e.g., a bucket of objects, according to one or more conditions. For example, downgrade a storage class of objects which are older than 200 days, or delete objects which were created before Jul. 22, 2014.

However, a usage pattern of the objects in a contact center, that is using a CCaaS solution, may change over time, and the lifecycle rules, which were configured in the past, might not be adequate or efficient for the current usage pattern which may lead to additional costs and an operation deficiency for the contact center.

Currently, there is no quantification or assessment of the effectiveness of the lifecycle rules of a cloud storage service of a CCaaS solution. Hence, contact centers, which are using CCaaS solution, are not able to visualize any shortcomings in the lifecycle rules set up. Moreover, the current system of CCaaS doesn't recommend any improvements in the lifecycle rules configuration to optimize the operations and storage of the interactions related objects.

Accordingly, there is a need for a technical solution that will analyze the usage patterns of the interaction recordings and other types of objects and analyze the quality of the overall effectiveness of the lifecycle rules which were set up by the customers of the CCaaS solution. Furthermore, the needed technical solution should provide recommendations to improve the lifecycle management of the interaction recordings based on the data points derived from the usage patterns.

Currently, there is a solution provided by Amazon Web Services (AWS) S3 of intelligent tiering, but it is very generic and does not consider a specific business domain, such as a contact center. AWS S3 intelligent tiering is merely checking the access patterns and then decides whether the files should be moved to another storage tier or not. It changes the storage class only after no-access to the file for 30, 90 and 180 consecutive days. However, some contact centers do not keep the files for such period of time or may wish to be notified beforehand about storage related inefficiencies.

Therefore, there is a need for a technical solution that will have access to the metadata of a file, to find a correlation between the metadata of the file, such as for example, media type of the interaction, agents and routing skills and the access pattern to the file, i.e., interactions related objects. The correlation that is found between the metadata and access pattern of the file by the needed technical solution has to provide useful insights to the contact center, upon which it will define the lifecycle rule for the interactions related objects in an efficient manner. Hence, by the needed technical solution, the contact center will take into account metadata of the interaction-recording objects and will not have to wait for 30, 90 and 180 consecutive days of no access to the interactions related objects, as provided by the current solutions.

SUMMARY

There is thus provided, in accordance with some embodiments of the present disclosure, a computerized-method for determining and utilizing an effectiveness of lifecycle management for storage of interactions-related objects, in a contact center.

Furthermore, in accordance with some embodiments of the present disclosure, in a computerized system that includes a processor, a data storage to store metadata of the interactions-related objects and a memory to store the data storage, said computerized system may be communicating with a multi-tier storage in a cloud environment having a lifecycle rules data storage to store one or more lifecycle-rules related to management of interactions-related objects, the processor may be operating a Retention Effectiveness Calculation (REC) module. The metadata of the interactions-related objects may include media type of the interaction, one or more agents that handled the interaction and routing skills by which the interaction has been routed, and other details. These details are also included in the criteria of the lifecycle-rules.

Furthermore, in accordance with some embodiments of the present disclosure, the operating of the REC module may include retrieving all lifecycle-rules from the lifecycle-rules data storage, according to a tenant identification. For each lifecycle-rule in the lifecycle rules data storage: the REC may calculate a Rule Effectiveness Score (RES) and then may group the calculated RES by media type. For each media type, the REC module may calculate an Object Retention Score (ORS) for the media type and then may divide an aggregation of the ORS of all media types by a total number of media types to yield a total ORS for a contact center. The REC may display via a display unit that is associated to the computerized system, the total ORS of the contact center.

Furthermore, in accordance with some embodiments of the present disclosure, the metadata related to interactions-related objects may be selected from at least one of: media type, one or more agents participating in an interaction, teams the one or more agents belong to, set of skills of the one or more agents used for routing the interaction, interaction start time, interaction duration, lifecycle rule with which the interaction is tagged, date of interaction, interaction access date, tenant identification and any other related data.

Furthermore, in accordance with some embodiments of the present disclosure, the calculating of the ORS for the media type may be performed by using equation I:

$$ORS = \frac{\sum_{K=1}^{N} RES}{N} - \left(1 - \frac{\text{interaction volume} - \text{untagged interaction volume}}{\text{interaction volume}}\right) \quad (I)$$

whereby,
N is a total number of lifecycle-rules for a media type,
RES is a RES for a lifecycle-rule,
untagged interaction volume is a total number of interactions-related objects that are not linked with any lifecycle-rule, and
interaction volume is a total number of interactions-related objects for the media type.

Furthermore, in accordance with some embodiments of the present disclosure, the ORS of the contact center may be displayed on the display unit with an indication as to effectiveness of lifecycle management, according to a preconfigured threshold. For example, the indication may be a color, such as green for good condition and red when the lifecycle rules should be changed or new ones should be created.

Furthermore, in accordance with some embodiments of the present disclosure, the calculating of the RES for each rule in the lifecycle rules data storage may be performed by dividing by '3' the sum of: (i) a number of interactions-related objects access from active storage; (ii) additional interactions-related object retention in active storage; and (iii) lessen interactions-related object retention in active storage. Thus, the calculated RES for each lifecycle rule is an average of the number of the terms in the sum, which is '3'.

Furthermore, in accordance with some embodiments of the present disclosure, the number of interactions-related objects access from active storage may be calculated by a subtraction from '1' of a subtraction of a total number of interaction-related objects accessed from a total number of interactions-related objects in active storage divided by the total number of interactions-related objects in active storage.

Furthermore, in accordance with some embodiments of the present disclosure, the additional interaction retention in active storage may be calculated by a subtraction from '1' of dividing a subtraction of average interactions-related object access days from active storage from retention of interactions-related objects in active storage by retention of interactions-related objects in active storage.

Furthermore, in accordance with some embodiments of the present disclosure, the average interactions-related object access days from active storage may be calculated based on interaction access date retrieved from the metadata of the interactions-related objects.

Furthermore, in accordance with some embodiments of the present disclosure, the retention of interactions-related objects in active storage may be derived from the date of interaction.

Furthermore, in accordance with some embodiments of the present disclosure, the lessen interaction retention in active storage may be calculated by a subtraction of volume of retrieved interactions divided by a sum of a volume of interactions in active storage and volume of interactions retrieved from '1'.

Furthermore, in accordance with some embodiments of the present disclosure, the computerized method may be further operating a User Interface (UI) associated to an admin-web application of the multi-tier storage in the cloud environment to enable a user to set lifecycle rules according to the displayed recommendations.

Furthermore, in accordance with some embodiments of the present disclosure, the media type of an interaction may be related to a communication channel by which the interaction has been conducted.

Furthermore, in accordance with some embodiments of the present disclosure, the communication channel may be selected from at least one of: audio call, video call, chat, email and other communication channel.

Furthermore, in accordance with some embodiments of the present disclosure, the one or more lifecycle-rules related to management of interactions-related objects may include: (i) rule criteria which are defined over the metadata of the interactions-related objects; and (ii) rule actions.

Furthermore, in accordance with some embodiments of the present disclosure, the rule actions may be: (i) transitioning the interactions-related objects from one storage class to another storage class in the multi-tier storage; and (ii) deleting the interactions-related objects.

Furthermore, in accordance with some embodiments of the present disclosure, the rule criteria may be based on criteria selected from at least one of: (i) media type; (ii) one or more agents participating in an interaction; (iii) set of skills of the one or more agents used for routing the interaction; (iv) teams to which the one or more agents belong to; (v) Dialed Numbers (DNI).

There is further provided, in accordance with some embodiments of the present disclosure, a computerized-system for determining and utilizing an effectiveness of lifecycle management for storage of interactions-related objects, in a contact center.

Furthermore, in accordance with some embodiments of the present disclosure, the computerized-system may include a processor, a data storage to store metadata of the interactions-related objects and a memory to store the data storage.

Furthermore, in accordance with some embodiments of the present disclosure, the computerized-system may be communicating with a multi-tier storage in a cloud environment having a lifecycle-rules data storage to store one or more lifecycle-rules related to management of interactions-related objects. The processor may be operating a Retention Effectiveness Calculation (REC) module. 100311 Furthermore, in accordance with some embodiments of the present disclosure, the REC module may be configured to retrieve all lifecycle-rules from the lifecycle-rules data storage, according to a tenant identification. For each lifecycle-rule in the lifecycle rules data storage the REC module may calculate a Rule Effectiveness Score (RES) and then may group the calculated RES by media type. For each media type, the REC module may calculate an Object Retention Score (ORS) for the media type and then, divide an aggregation of the ORS of all media types by a total number of media types to yield a total ORS for a contact center. The REC module may display via a display unit that is associated to the computerized system the total ORS of the contact center.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Current contact centers are using Contact Center as a Service (CCaaS) solution. Commonly, the contact center configures an object lifecycle management. However, the configuration of the lifecycle rules may lead to various scenarios which may reflect operational deficiency and unnecessary costs. For example, when customers set up lifecycle-rules to keep the interactions-related objects in the active storage, which is the most expensive storage class, for a prolonged time as compared to the actual access to the interactions-related objects. In another example, customers may set up the lifecycle-rules to keep the interactions-related objects in the active storage for a shorter period as compared to the actual need to access these interactions-related objects. The implication of this scenario is that the customers have to bring back the interactions-related objects to the active storage in order to use them, which is bearing extra cost and operation deficiency.

In yet another example of operational deficiency, customers of CCaaS may not configure lifecycle-rules for a certain section of interactions-related objects, which is causing these objects to be available in the active storage forever, hence adding costs to the customers.

Accordingly, there is a need for a system and method for determining and utilizing an effectiveness of lifecycle management for storage of interactions-related objects, in a contact center.

Figure 1A:
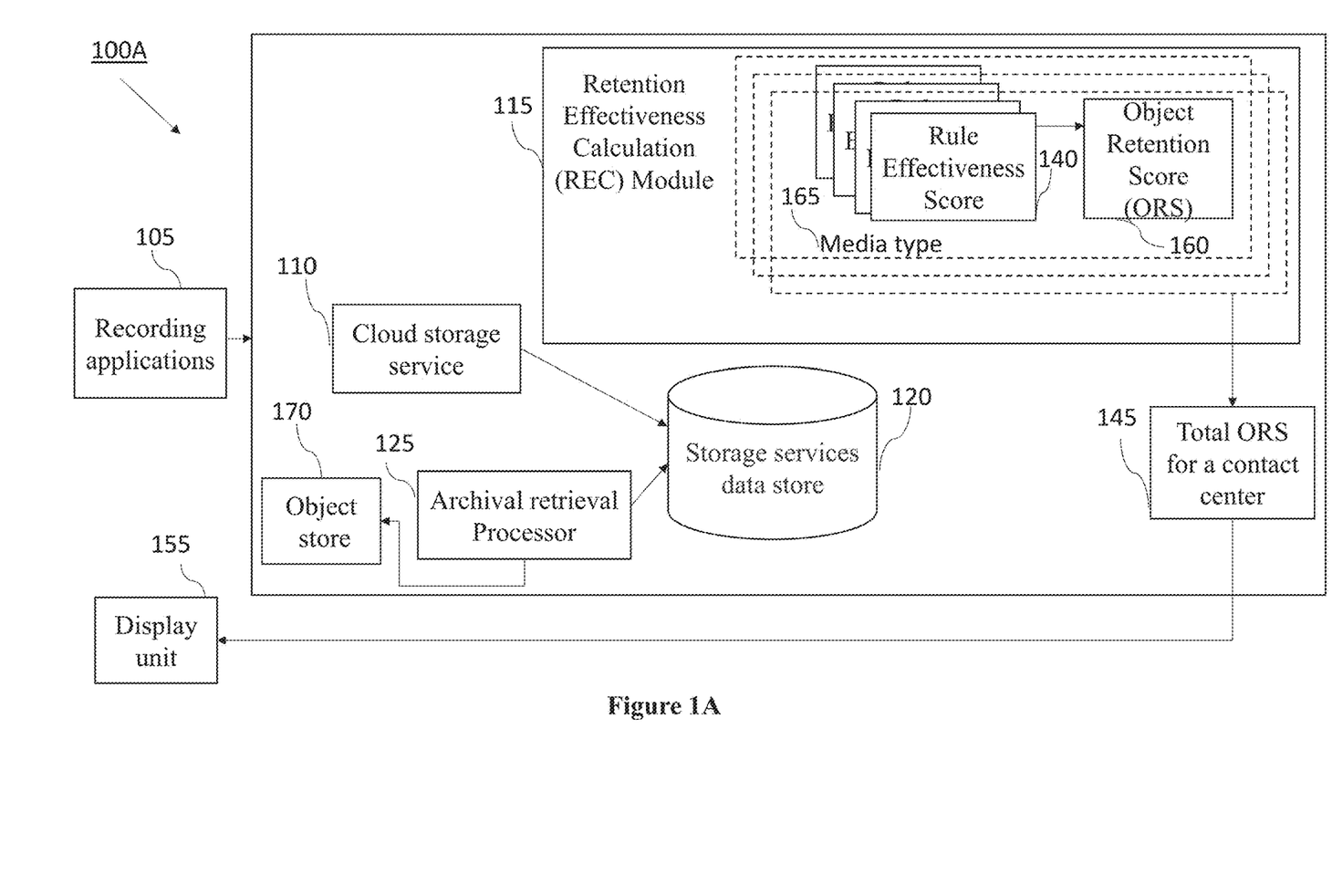
FIGS. 1A-1B schematically illustrate a high-level diagram of a computerized system for determining and utilizing an effectiveness of lifecycle management for storage of interactions-related objects, in a contact center, in accordance with some embodiments of the present disclosure.

FIG. 1A schematically illustrates a high-level diagram of a computerized system 100A for determining and utilizing an effectiveness of lifecycle management for storage of interactions-related objects, in a contact center, in accordance with some embodiments of the present disclosure.

According to some embodiments of the present disclosure, interactions-related objects, such as screen recordings, video recordings, emails and chat transcripts, email attachments and the like in a Contact Center as a Service (CCaaS) solution, follow a lifecycle that is defined by the customer. Customers are needed to store the interactions-related objects for a predefined time, for various purposes, such as compliance requirements, dispute management and training and quality purpose and the like. When the customer is defining the lifecycle of an interactions-related object, the customer may strive to optimize the cost of the storage and increase the operational efficiency of the contact center.

According to some embodiments of the present disclosure, the customer may choose to move the interactions-related objects to a long-term storage class to save the cost. In such a case, there are extra charges that the customer has to bear to bring back the interactions-related objects to the active storage class to be able to access and use them and there is also some delay associated with the process to bring the interactions-related object from long-term storage to active storage, such as object store 170.

According to some embodiments of the present disclosure, to store the interactions-related objects for a predefined time, a contact center may use recording applications, such as recording applications 105, which may send interactions-related objects to a cloud storage service, such as cloud storage service 110 upon completion of the interaction. An upload service, which is a part of the storage services eco-system is responsible for storing the interactions-related objects. Typically, the interactions-related objects are stored in an object store, like AWS S3, Azure Storage, etc. The storage services, such as cloud storage service 110, are also responsible for execution of the lifecycle operations on the interactions-related objects. For example, transitioning the storage class of the interactions-related objects, purging the interactions-related objects and the like. The recording applications, such as recording applications 105 may be operated in a cloud computing environment or on premise at the customer's site.

According to some embodiments of the present disclosure, the cloud storage service, such as cloud storage service 110, may be operating a tiering storage that stores objects in several access tiers, tiers for frequent and infrequent access, and archive access tiers for rare access. The multi-tier storage in a cloud environment, such as cloud storage service 110, may have a storage services data store, such as storage services data store 120, to store one or more life-cycle-rules related to management of interactions-related objects.

Commonly, an interaction-related object, in a contact center, has some metadata associated with it. Some of the attributes in the interaction metadata may be the one or more agents participating in the interaction, teams the one or more agents belong to, set of skills of the one or more agents used for routing the interaction, interaction start time, interaction duration, lifecycle rule with which the interaction is tagged, date of interaction, interaction access date, tenant identification and any other related data. The storage services data store, such as storage services data store 120 may be also used for persisting the metadata of an interaction and to record the lifecycle events for the interactions.

Lifecycle events for the interactions are recorded to apply the designated business functionality and audit purpose. For example, if the interactions-related object is stored in the long-term storage, then the allowed operations for the object e.g., initiate a retrieval process, might be different from the operations for an object that is stored in the active storage.

According to some embodiments of the present disclosure, the one or more lifecycle-rules related to management of interactions-related objects may include: (i) rule criteria which are defined over the metadata of the interactions-related objects and (ii) rule actions. The rule actions are: (i) transitioning the interactions-related objects from one storage class to another storage class in the multi-tier storage and (ii) deleting the interactions-related objects.

According to some embodiments of the present disclosure, the rule criteria are based on criteria selected from at least one of: (i) media type; (ii) one or more agents participating in an interaction; (iii) set of skills of the one or more agents used for routing the interaction; (iv) teams to which the one or more agents belong to; and (v) Dialed Numbers (DNI).

According to some embodiments of the present disclosure, for example, a lifecycle rule created by a customer may instruct that a transition of interactions-related objects from active storage to long-term storage is performed after 30 days for interactions-related objects of media type of call recordings. To determine whether an interactions-related object has been created before 30 days or not, the attribute of date of interaction is taken from the metadata of the interactions-related object. In yet another example, a life-cycle rule may instruct that all the interactions-related objects of media type of screen recording and the agents includes at least one of agents 'A11', 'A12' and routing skills include 'S10' will be transitioned from active storage to long-term storage in 20 days. Therefore, the retention period according to this lifecycle rule is 20 days in active storage.

According to some embodiments of the present disclosure, the media type may be related to a communication channel by which the interaction has been conducted. The communication channel may be selected from at least one of: audio call, video call, chat, email and other communication channel.

When an interactions-related object is stored in a long-term storage, the interactions-related object cannot be accessed. For access to the interactions-related object it has to be brought back from long-term storage. According to some embodiments of the present disclosure, an archival retrieval processer, such as archival retrieval processor 125, may be communicating with the storage services data store, such as storage services data store 120 to transition interactions-related objects long-term storage to active storage, such as object storage 170.

Figure 7:
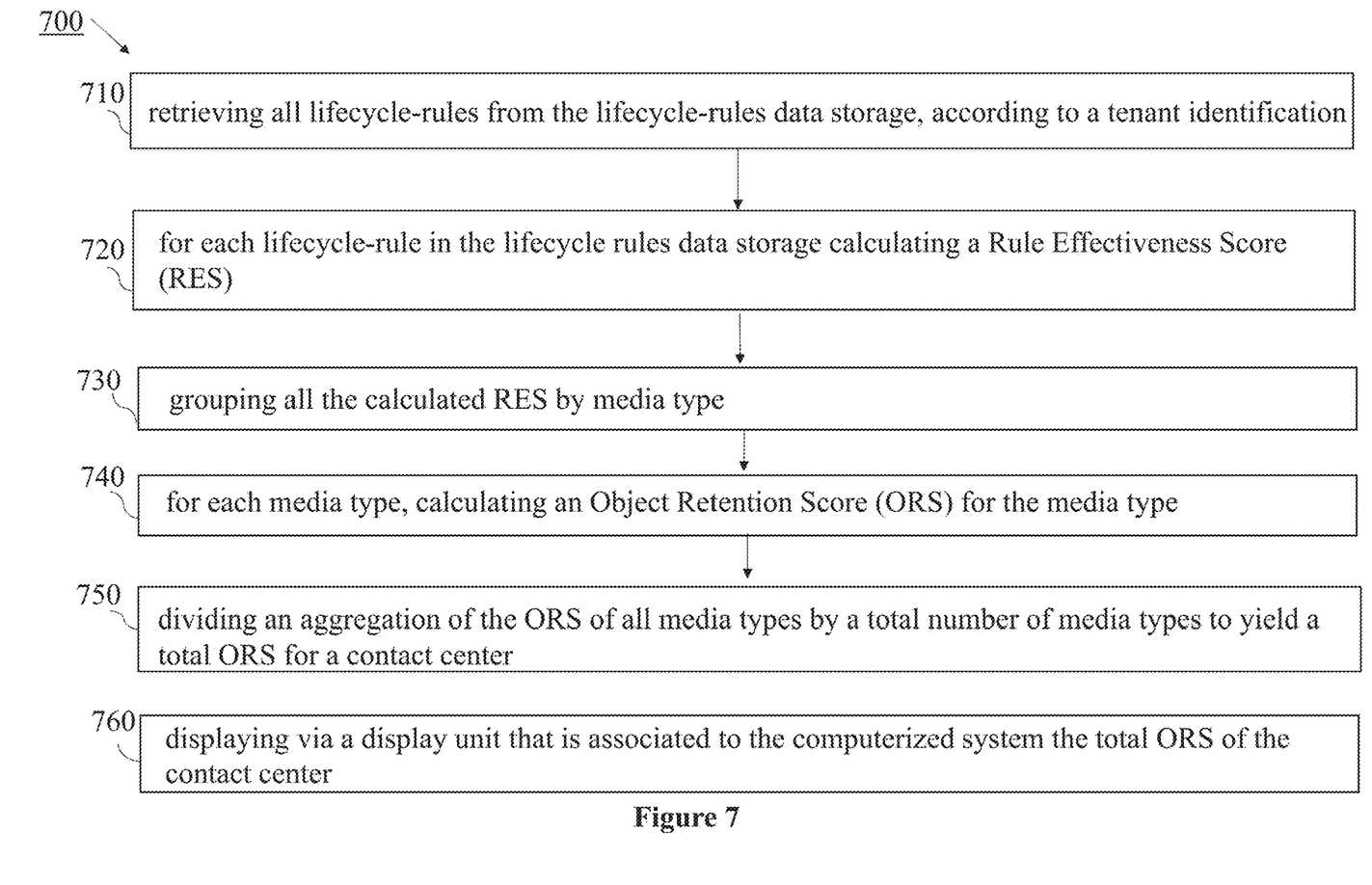
FIG. 7 is a high-level workflow of a Retention Effectiveness Calculation (REC) module, in accordance with some embodiments of the present disclosure.

According to some embodiments of the present disclosure, a Retention Effectiveness Calculation (REC) module, such as REC module 115 and REC module 700 in FIG. 7, may be operated for determining and utilizing an effectiveness of lifecycle management for storage of interactions-related objects, in the contact center.

According to some embodiments of the present disclosure, the REC module, such as REC module 115 and such as RFC module 700 in FIG. 7, may be retrieving all lifecycle-rules from the lifecycle-rules data storage, such as storage services data store 120, according to a tenant identification. Then, for each lifecycle-rule in the lifecycle rules data storage, the REC module, such as REC module 700 in FIG. 7, may be calculating a Rule Effectiveness Score (RES) and then grouping the calculated one or more RES, such as one or more RES 140, by media type.

According to some embodiments of the present disclosure, the REC module, such as RES module 115 and such as REC module 700 in FIG. 7 may calculate the RES for each rule in the lifecycle rules data storage is performed by dividing by '3' the sum of: (i) a number of interactions-related objects access from active storage; (ii) additional interactions-related object retention in active storage; and (iii) lessen interactions-related object retention in active storage.

According to some embodiments of the present disclosure, the number of interactions-related objects access from active storage may be calculated by a subtraction from '1' of a subtraction of a total number of interaction-related objects accessed from a total number of interactions-related objects in active storage divided by the total number of interactions-related objects in active storage.

According to some embodiments of the present disclosure, the additional interaction retention in active storage may be calculated by a subtraction from '1' of dividing a subtraction of average interactions-related object access days from active storage from retention of interactions-related objects in active storage by retention of interactions-related objects in active storage.

According to some embodiments of the present disclosure, the average interactions-related object access days from active storage may be calculated based on interaction access date retrieved from the metadata of the interactions-related objects.

According to some embodiments of the present disclosure, the retention of interactions-related objects in active storage may be derived from the date of interaction. The lessen interaction retention in active storage may be calculated by a subtraction of volume of retrieved interactions divided by a sum of a volume of interactions in active storage and volume of interactions retrieved from '1'.

According to some embodiments of the present disclosure, the REC module, such as REC module 115 and such as REC module 700 in FIG. 7, for each media type, may calculate an Object Retention Score (ORS) for the media type, such as ORS 160.

According to some embodiments of the present disclosure, the REC module, such as REC module 115 and such as REC module 700 in FIG. 7, may divide an aggregation of the ORS of all media types, such as aggregation 165 by a total number of media types to yield a total ORS for the contact center, such as total ORS for a contact center 145.

According to some embodiments of the present disclosure, the REC module, such as REC module 115 and such as REC module 700 in FIG. 7, may display via a display unit, such as display unit 155, that is associated to the computerized system 100A the total ORS of the contact center. The total ORS of the contact center may be displayed on the display unit, such as display unit 155, with an indication as to effectiveness of lifecycle management, according to a preconfigured threshold.

According to some embodiments of the present disclosure, the lifecycle rules are defined using metadata attributes as the criteria. The lifecycle rules also consist of the actions that will be applied to the interaction recording once a match is found with the criteria. Since there can be multiple lifecycle rules per media type hence every lifecycle rule also has a priority defined. When an interactions-related object comes from recording applications, such as recording applications 105, into cloud storage service, such as cloud storage service 110, its metadata is compared against the metadata attributes defined in the one or more lifecycle rule which are stored in the storage services data store, such as storage services data store 120.

According to some embodiments of the present disclosure, since a Rule Effectiveness Score (RES) may be calculated for every lifecycle rule, hence it is an indication of how effective is the rule criteria which includes the interactions-related object metadata and the action is.

Figure 1B:
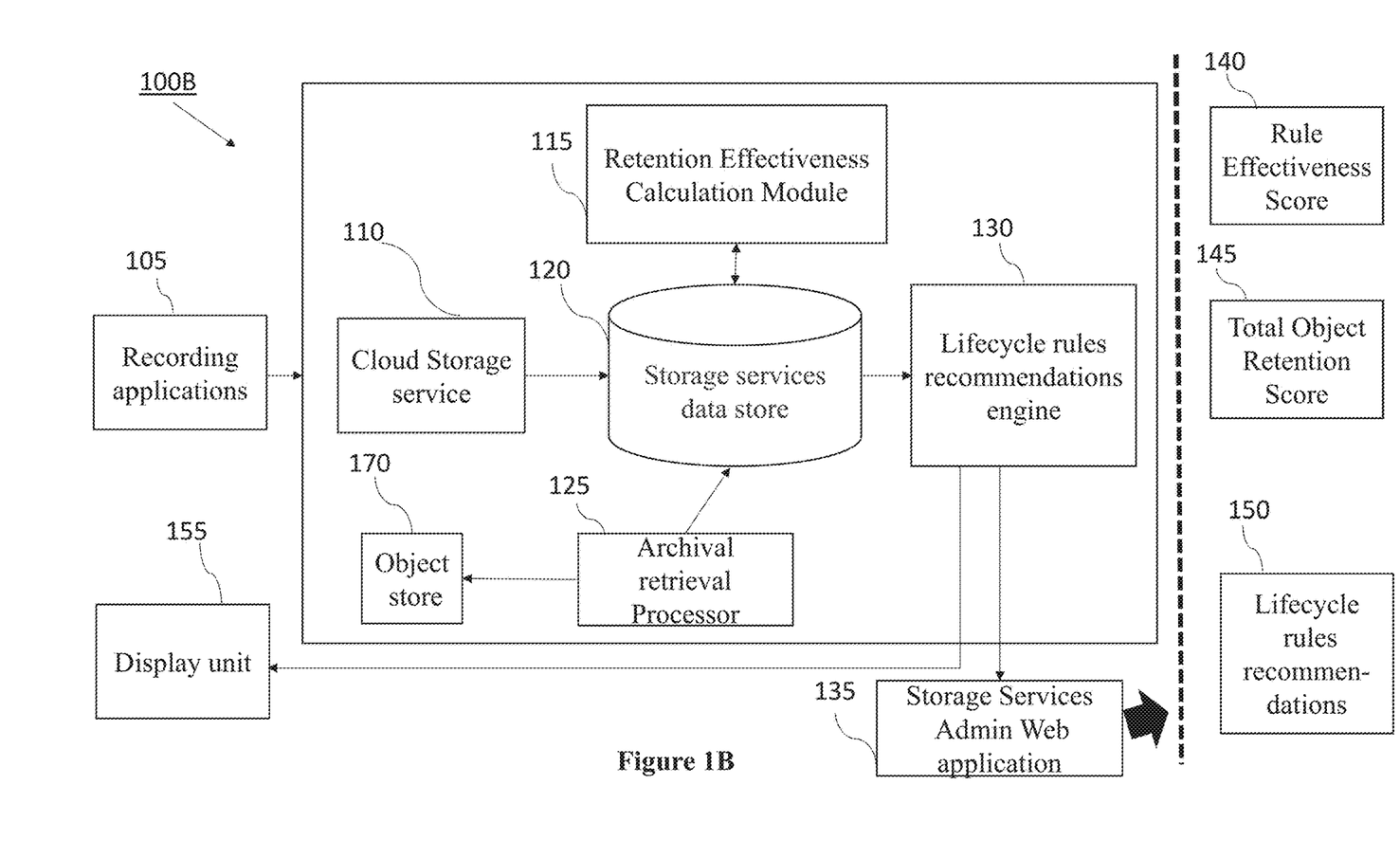

FIG. 1B schematically illustrates a high-level diagram of a computerized system 100B for determining and utilizing an effectiveness of lifecycle management for storage of interactions-related objects, in a contact center, in accordance with some embodiments of the present disclosure.

According to some embodiments of the present disclosure, based on calculations of a Retention Effectiveness Calculation (REC) module, such as REC module 115 and such as REC module 700 in FIG. 7, the total ORS, such as total ORS for a contact center 145, may be further used to provide recommendations to optimize effectiveness of lifecycle management. The change in existing lifecycle rules and the creation of new lifecycle rules may save storage costs to the contact center and may increase the operational efficiency.

According to some embodiments of the present disclosure, in addition to the elements of system 100A in FIG. 1A, recording applications 105, cloud storage service 110, REC module 115, storage services data store 120, archival retrieval processor 125, object store 170 and display unit 155, system 100B may include a lifecycle rules recommendations engine, such as lifecycle recommendations engine 130 to display lifecycle rules recommendations 150. The lifecycle rules recommendations 150, may include recommendations to create new lifecycle rules or change existing ones, as shown in example 400 in FIG. 4.

According to some embodiments of the present disclosure, the lifecycle rules recommendations 150 may be displayed via the display unit, such as display unit 155.

According to some embodiments of the present disclosure, system 100B may be associated to a User Interface (UI) associated to an admin-web application of the multi-tier storage in the cloud environment, such as storage services admin web application 135 to enable a user to set new lifecycle rules according to the displayed recommendations or change existing ones.

Figure 2:
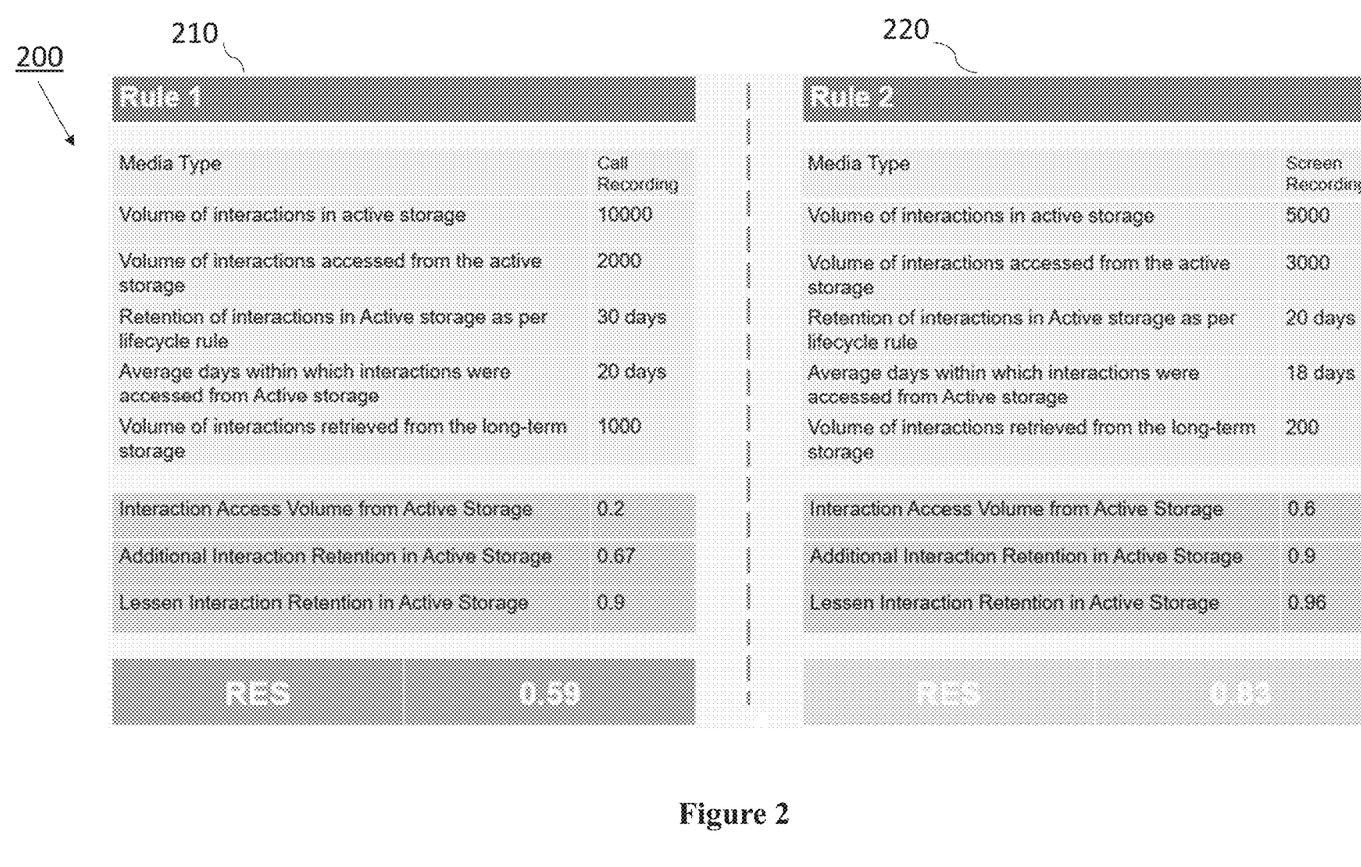
FIG. 2 shows an example of two lifecycle rules and calculation of related Rule Effectiveness Score (RES), in accordance with some embodiments of the present disclosure.

FIG. 2 shows an example 200 of two lifecycle rules and calculation of related Rule Effectiveness Score (RES), in accordance with some embodiments of the present disclosure.

According to some embodiments of the present disclosure, a Retention Effectiveness Calculation (REC) module, such as REC module 115 in FIGS. 1A-1B and such as REC module 700 in FIG. 7, may calculate RES for each rule in the lifecycle rules data storage which may be performed by dividing by '3' the sum of: (i) a number of interactions-related objects access from active storage; (ii) additional interactions-related object retention in active storage; and (iii) lessen interactions-related object retention in active storage.

According to some embodiments of the present disclosure, the number of interactions-related objects access from active storage may be calculated by a subtraction from '1' of a subtraction of a total number of interaction-related objects accessed from a total number of interactions-related objects in active storage divided by the total number of interactions-related objects in active storage.

According to some embodiments of the present disclosure, the additional interaction retention in active storage may be calculated by a subtraction from '1' of dividing a subtraction of average interactions-related object access days from active storage from retention of interactions-related objects in active storage by retention of interactions-related objects in active storage. The average interactions-related object access days from active storage may be calculated based on interaction access date retrieved from the metadata of the interactions-related objects.

According to some embodiments of the present disclosure, for example, according to a lifecycle rule, such as lifecycle rule 210 for media type call recording and agents 'A1', 'A2' and routing skills 'S1', the active to long-term storage is 30 days and the long-term storage to delete an object is 165 days.

According to some embodiments of the present disclosure, when a volume of interactions e.g., interactions-related objects in active storage is of 10,000, a volume of interactions e.g., interactions-related objects accessed from the active storage is of 2,000, a retention of interactions e.g., interactions-related objects in active storage as per lifecycle of 30 days, an average days within which interactions e.g., interactions-related objects were accessed from active storage of 20 days and volume of interactions e.g., interactions-related objects, retrieved from the long-term storage is 1,000.

According to some embodiments of the present disclosure, according to the rule criteria which are defined over the metadata of the interactions-related objects and the rule actions, the following data points may be calculated: (i) a number of interactions-related objects access from active storage, such as interaction access volume from active storage 410 in FIG. 4; (ii) additional interactions-related object retention in active storage, i.e., additional interaction retention in active storage 420 in FIG. 4; and (iii) lessen interactions-related object retention in active storage, lessen interaction retention in active storage 430 in FIG. 4.

According to some embodiments of the present disclosure, a Retention Effectiveness Calculation (REC) module, such as REC module 115 and such as REC module 700 in FIG. 7, may calculate the RES of rule 210 as '0.59, by dividing by '3' the sum of: (i) a number of interactions-related objects access from active storage, e.g. interaction access volume from active storage equals '0.2'; (ii) additional interactions-related object retention in active storage, e.g., additional interactions-related object retention in active storage equals '0.67'; and (iii) lessen interactions-related object retention in active storage, e.g., lessen interactions-related object retention in active storage equals '0.9'.

According to some embodiments of the present disclosure, according to a lifecycle rule such as lifecycle rule 220 for media type call recording and agents 'A11', 'A12' and routing skills 'S10', the active to long-term storage is 20 days and the long-term storage to delete an object is 180 days.

According to some embodiments of the present disclosure, when a volume of interactions e.g., interactions-related objects, in active storage is of 5,000, a volume of interactions e.g., interactions-related objects, accessed from the active storage is of 3,000, a retention of interactions e.g., interactions-related objects, in active storage as per lifecycle of 20 days, an average days within which interactions e.g., interactions-related objects, were accessed from active storage of 18 days and volume of interactions retrieved from the long-term storage of 200.

According to some embodiments of the present disclosure, the calculated RES of rule 220 is '0.83'. It may be calculated by a REC module, such as REC module 700 and REC module 115 in FIG. 1A-1B, by dividing by '3' the sum of: (i) a number of interactions-related objects access from active storage, e.g. interaction access volume from active storage equals '0.6'; (ii) additional interactions-related object retention in active storage, e.g., additional interactions-related object retention in active storage equals '0.9'; and (iii) lessen interactions-related object retention in active storage, e.g., lessen interactions-related object retention in active storage equals '0.96'.

Figure 3:
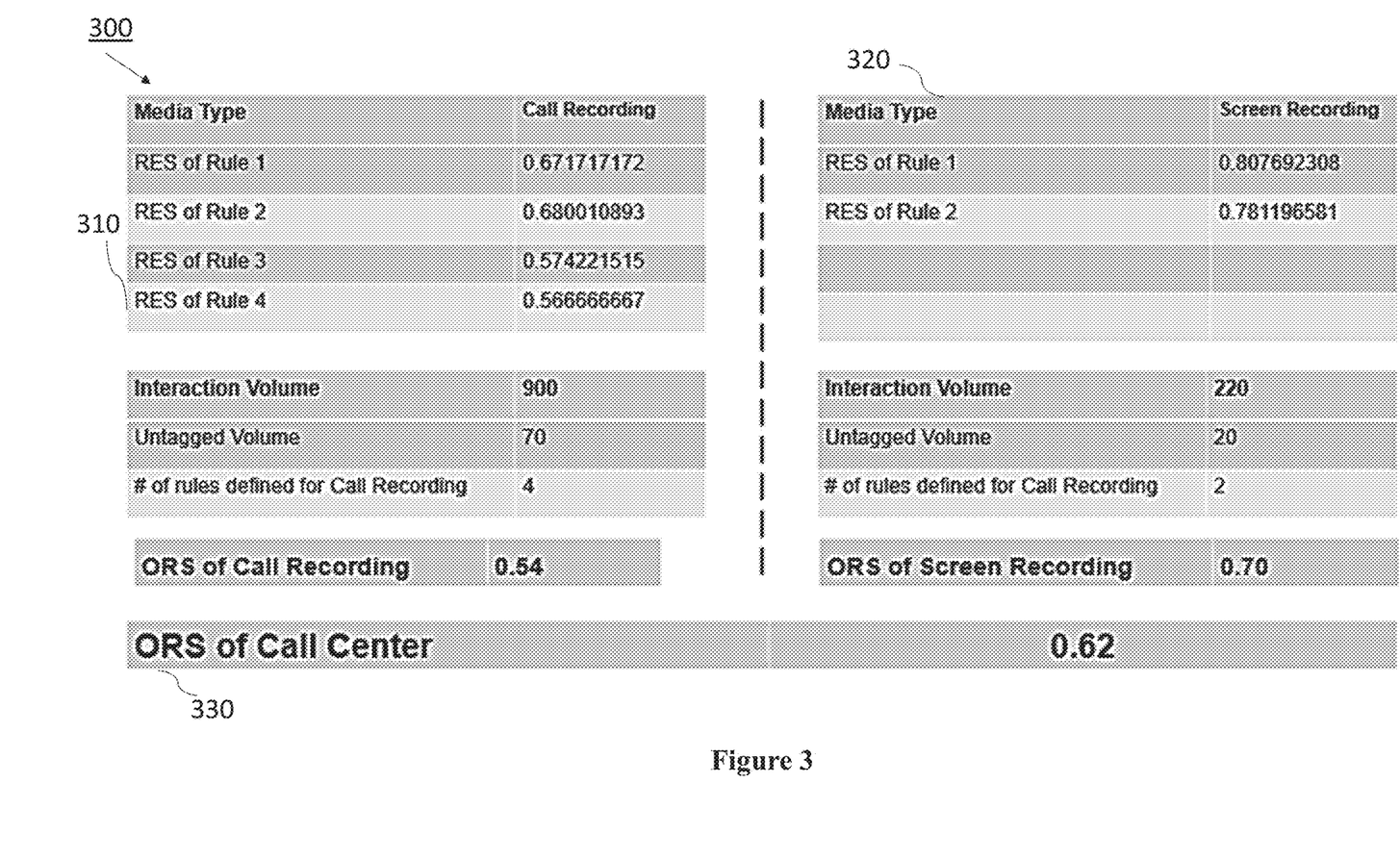
FIG. 3 shows an example of Object Retention Score (ORS) calculation for two media types and a calculation of a total ORS, in accordance with some embodiments of the present disclosure.

FIG. 3 shows an example 300 of Object Retention Score (ORS) calculation for two media types and a calculation of a total ORS, in accordance with some embodiments of the present disclosure.

According to some embodiments of the present disclosure, a Retention Effectiveness Calculation (REC) module, such as REC module 700 and RFC module 115 in FIG. 1A-1B, may calculate a total Object Retention Score (ORS) of a contact center such as ORS 330.

According to some embodiments of the present disclosure, the contact center may define four lifecycle rules for interactions-related objects of media type call recording, such as lifecycle rules 310 and two lifecycle rules for interactions-related objects of media type screen recordings, such as lifecycle rules 320.

According to some embodiments of the present disclosure, for example, the Retention Effectiveness Calculation module, such as REC module 700 in FIG. 7 and REC module 115 in FIG. 1A-1B, may calculate Rule Effectiveness Score (RES) for each lifecycle rule of the four lifecycle rules for interactions-related objects of media type call recording, such as lifecycle rules 310 to be '0.671717172', '0.680010893', '0.574221515' and '0.566666667' respectively.

According to some embodiments of the present disclosure, for example, the REC module, such as REC module 700 in FIG. 7 and REC module 115 in FIG. 1A-1B, may calculate an ORS for the media type of call recording based on equation 1:

$$ORS = \frac{\sum_{K=1}^{N} RES}{N} - \left(1 - \frac{\text{interaction volume} - \text{untagged interaction volume}}{\text{interaction volume}}\right)$$

whereby,
N is a total number of lifecycle-rules for a media type,
RES is a RES for a lifecycle-rule,
untagged interaction volume is a total number of interactions-related objects that are not linked with any lifecycle-rule, and
interaction volume is a total number of interactions-related objects for the media type.

According to some embodiments of the present disclosure, in example 300 the interaction volume of media type of call recording, may be '900' the untagged volume i.e., interaction volume of media type of call recording, may be '70' and the number of lifecycle-rules for the media type of call recording is four. Therefore, according to equation I, the ORS for the call recording may be calculated as follows: (0.671717172+0.680010893+0.574221515+0.566666667)/ 4−(1−(900−70)/900)=0.54

According to some embodiments of the present disclosure, in example 300 the interaction volume of media type of screen recording, may be '220' the untagged volume, i.e., interaction volume may be '20' and the number of lifecycle-rules for the media type is two. Therefore, according to equation I, the ORS for the screen recording is 0.7.

According to some embodiments of the present disclosure, the REC module, such as REC module 700 and REC module 115 in FIG. 1A-1B, may divide an aggregation of the ORS of all media types e.g., two types of media type call recording and screen recording by a total number of media types to yield a total ORS for a contact center. Therefore, the total ORS of the contact center in example 300 is 0.62.

According to some embodiments of the present disclosure, the total ORS of the contact center in example 300, which is 0.62 may be displayed on a display unit, such as display unit 155 in FIGS. 1A-1B with an indication as to the effectiveness of lifecycle management for storage of interactions-related objects, in the contact center. For example, the total ORS may be displayed marked in green when it is below a predefined threshold.

Figure 4:
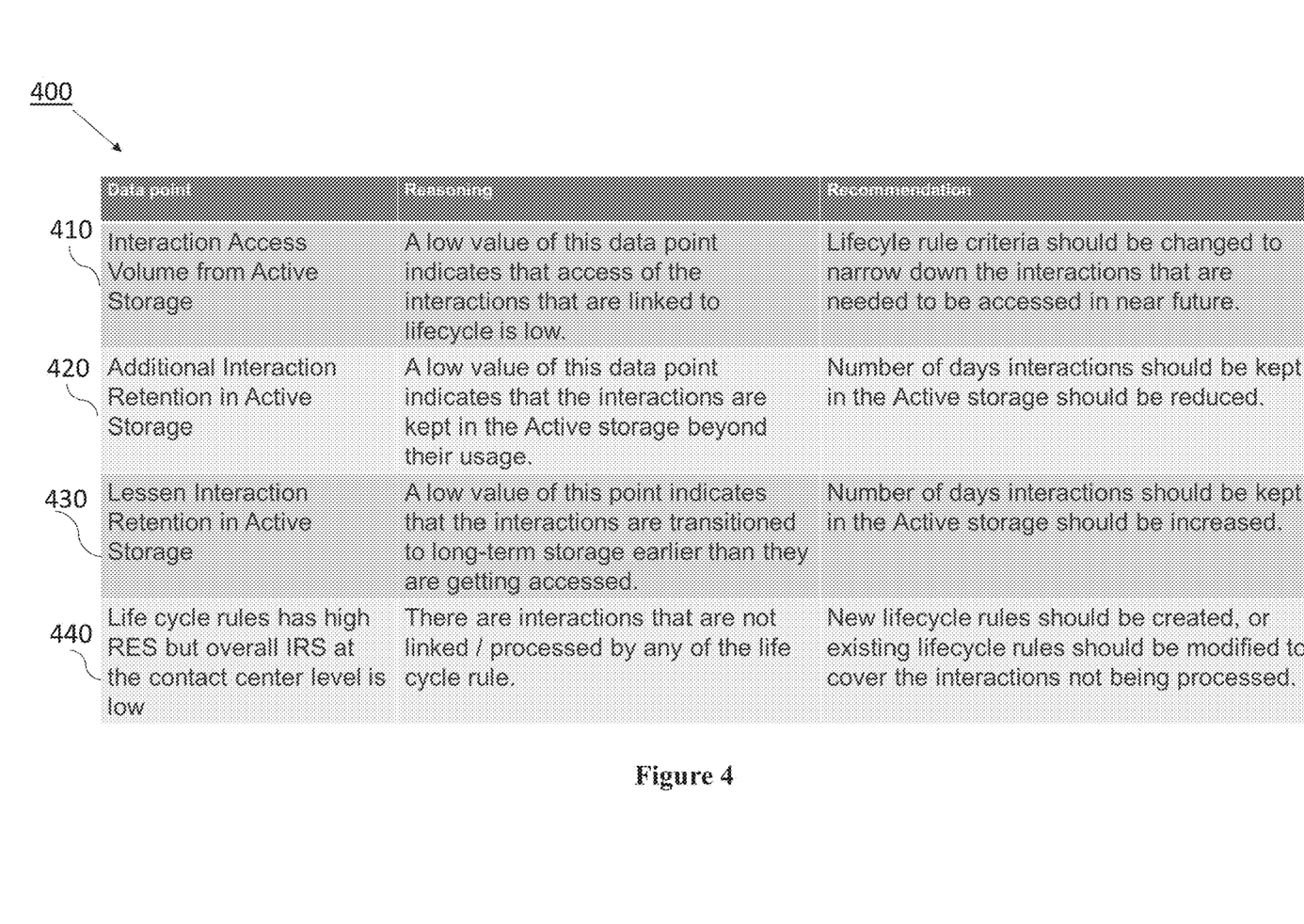
FIG. 4 shows an example of recommendations to optimize effectiveness of lifecycle management of objects, in accordance with some embodiments of the present disclosure.

FIG. 4 shows an example 400 of recommendations to optimize effectiveness of lifecycle management of objects, in accordance with some embodiments of the present disclosure.

According to some embodiments of the present disclosure, a Retention Effectiveness Calculation (REC) module, such as REC module 700 in FIG. 7 and REC module 115 in FIG. 1A-1B, may calculate a Rule Effectiveness Score (RES) for each lifecycle rule to yield a an Object Retention Score (ORS) for each media type and a total ORS for a contact center, upon which a lifecycle rules recommendations engine, such as lifecycle rules recommendations engine 130 in FIG. 1B may provide recommendations to optimize the effectiveness of lifecycle management for various data points which have been used to calculate the RES for each lifecycle rule.

According to some embodiments of the present disclosure, the calculation of each RES may comprise checking the following data points: (i) a number of interactions-related objects access from active storage, i.e. interaction access volume from active storage 410; (ii) additional interactions-related object retention in active storage, i.e., additional interaction retention in active storage 420; and (iii) lessen interactions-related object retention in active storage, lessen interaction retention in active storage 430.

According to some embodiments of the present disclosure, the lifecycle rules recommendations engine, such as lifecycle rules recommendations engine 130 in FIG. 1B, may also check a data point such as lifecycle rules has high RES but overall ORS at the contact center level is low 440, meaning if the RES is higher than a predefined threshold and the total ORS is lower than a predefined threshold it means that there are interaction-related objects that are not liked or processed by any of the lifecycle rules.

According to some embodiments of the present disclosure, for example, for a data point such as interaction access volume from active storage 410, the lifecycle rules recommendations engine, such as lifecycle rules recommendations engine 130 in FIG. 1B, upon receiving an indication that there is a low level of interaction access volume from active storage, which means that access of the interactions-related objects that are linked to a lifecycle-rule is low, the lifecycle rules recommendations engine, such as lifecycle rules recommendations engine 130 in FIG. 1B, may provide a recommendation, such as 'lifecycle criteria, should be changed to narrow down the interactions that are needed to be accessed in near future'.

According to some embodiments of the present disclosure, for example, for a data point such as additional interaction retention in active storage 420, the lifecycle rules recommendations engine, such as lifecycle rules recommendations engine 130 in FIG. 1B, upon receiving an indication that there is a low level of additional interaction retention in active storage of the interactions-related objects which means that they are kept in the active storage beyond their usage, the lifecycle rules recommendations engine, such as lifecycle rules recommendations engine 130 in FIG. 1B, may provide a recommendation, such as 'number of days interactions should be kept in the active storage should be reduced'.

According to some embodiments of the present disclosure, for example, for a data point such as lesson interaction retention in active storage 430, the lifecycle rules recommendations engine, such as lifecycle rules recommendations engine 130 in FIG. 1B, upon receiving an indication that there is a low level of lesson interaction retention in active storage of the interactions-related objects which means that they are transitioned to long-term storage earlier than they are getting accessed, the lifecycle rules recommendations engine, such as lifecycle rules recommendations engine 130 in FIG. 1B, may provide a recommendation, such as 'number of days interactions should be kept in the active storage should be increased'.

According to some embodiments of the present disclosure, for example, for a data point such as lesson interaction retention in active storage 440, the lifecycle rules recommendations engine, such as lifecycle rules recommendations engine 130 in FIG. 1B, upon receiving an indication that a lifecycle-rules has a high Rule Effectiveness Score (RES) but overall ORS at the contact center level is low, which means that there are interactions-related objects that are not liked or processed by any of the lifecycle rules, the lifecycle rules recommendations engine, such as lifecycle rules recommendations engine 130 in FIG. 1B, may provide a recommendation such as 'new lifecycle rules should be created, or existing lifecycle rules should be modified to cover the interactions not being processed'.

According to some embodiments of the present disclosure, the recommendations may be displayed via a display unit, such as display unit 155 in FIG. 1B.

Figure 5:
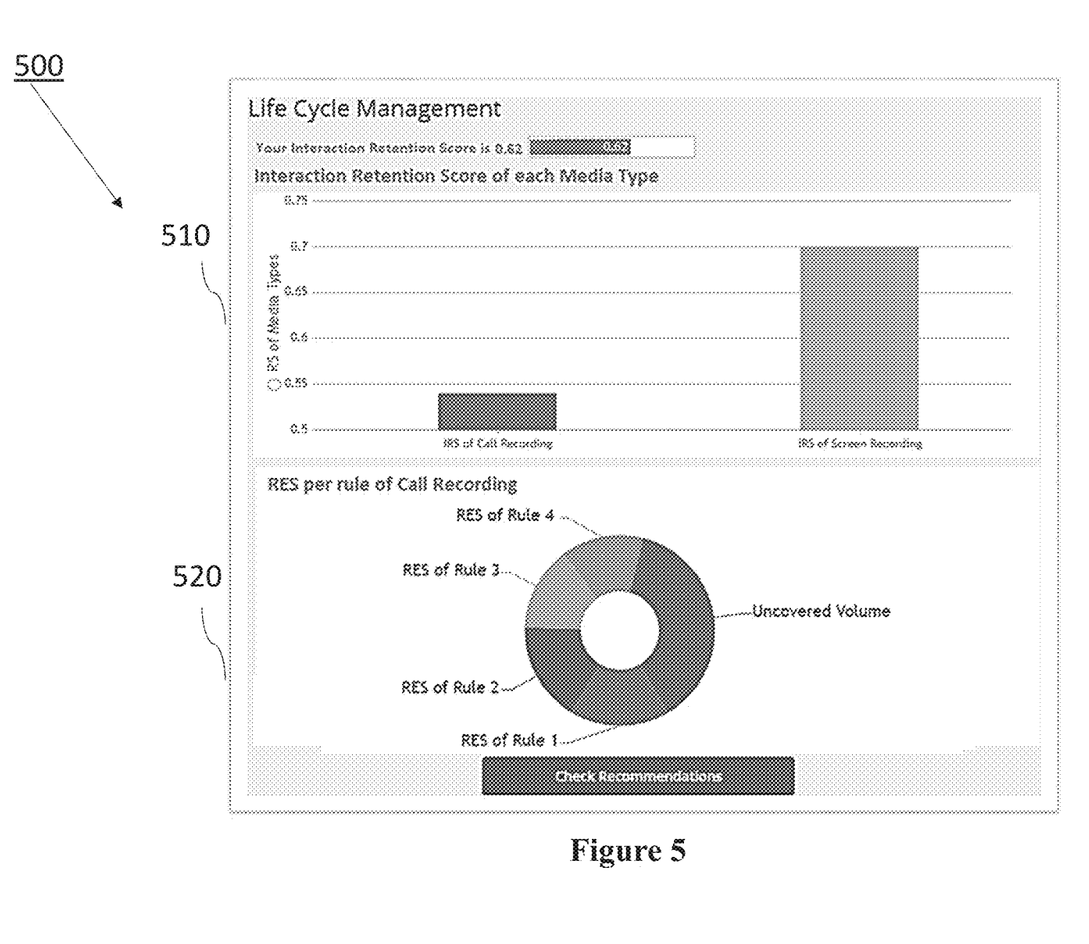
FIG. 5 shows an example of life cycle management including total ORS for a contact center, ORS for each media type and RES per lifecycle-rule of call recording, in accordance with some embodiments of the present disclosure.

FIG. 5 shows an example 500 of life cycle management including total ORS for a contact center, ORS for each media type and RES per rule of call recording, in accordance with some embodiments of the present disclosure.

According to some embodiments of the present disclosure, a Retention Effectiveness Calculation (REC) module, such as REC module 700 in FIG. 7 and REC module 115 in FIG. 1A-1B, may display via a display unit, such as display unit 155 in FIGS. 1A-1B, that is associated to the computerized system, such as system 100A in FIG. 1A and system 100B in FIG. 1B, the total ORS of the contact center with an indication as to effectiveness of lifecycle management, according to a preconfigured threshold. For example, the indication may be marked in green when the contact center has a good ORS and red when it requires improvement.

According to some embodiments of the present disclosure, a Retention Effectiveness Calculation (REC) module, such as REC module 700 in FIG. 7 and REC module 115 in FIG. 1A-1B may display the ORS score for each media type 510.

According to some embodiments of the present disclosure, a REC module, such as REC module 700 in FIG. 7 and REC module 115 in FIG. 1A-1B, may display the RES for each lifecycle rule per each media type 520.

Figure 6:
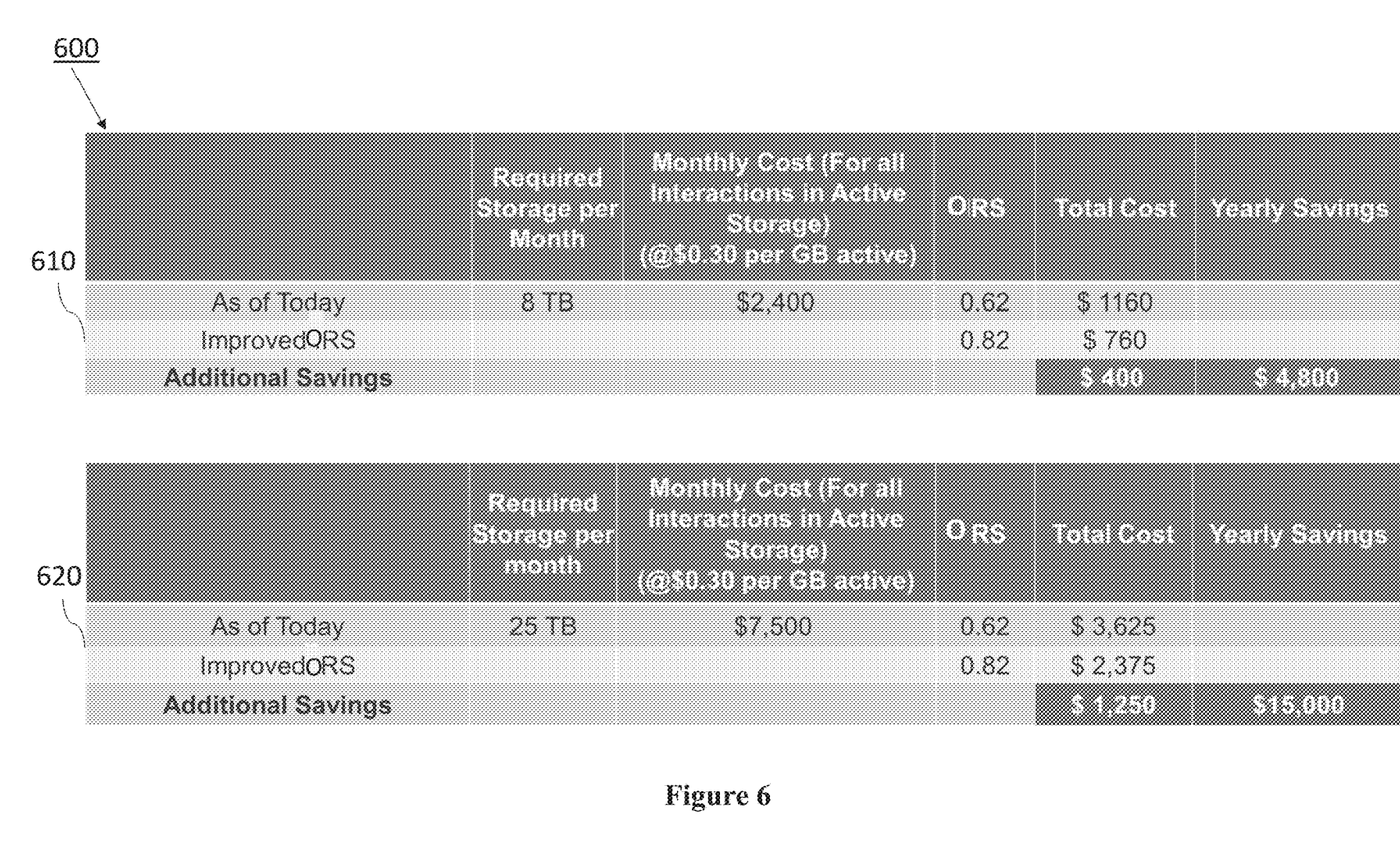
FIG. 6 shows an example of yearly savings by implementing a computerized method and a computerized system for determining and utilizing an effectiveness of lifecycle management for storage of interactions-related objects, in accordance with some embodiments of the present disclosure.

FIG. 6 shows two examples 600 of yearly savings by implementing a computerized method and a computerized system for determining and utilizing an effectiveness of lifecycle management for storage of interactions-related objects, in accordance with some embodiments of the present disclosure.

According to some embodiments of the present disclosure, example 610 shows an example when monthly cost for 8 TB is of $2,400 for which an implementation of a Retention Effectiveness Calculation (REC) module, such as REC module 700 in FIG. 7 and REC module 115 in FIG. 1A-1B may calculate a total Object Retention Score (ORS) of '0.62'.

According to some embodiments of the present disclosure, upon implementing one or more recommendations of the lifecycle rules recommendations engine, such as lifecycle rules recommendations engine 130 in FIG. 1B, such as in example 400 in FIG. 4, the REC module, such as REC module 700 in FIG. 7 and REC module 115 in FIG. 1A-1B, may calculate a total ORS of '0.82'.

According to some embodiments of the present disclosure, such an improvement, as shown in example 610, from a total ORS of '0.62' to a total ORS of '0.82', may reduce the monthly cost in S400, which may translate to 54,800 yearly savings.

According to some embodiments of the present disclosure, example 620 shows another example when monthly cost for 25 TB is of $7,500 for which an implementation of a REC module, such as REC module 700 in FIG. 7 and REC module 115 in FIG. 1A-1B, may calculate a total ORS of '0.62'.

According to some embodiments of the present disclosure, upon implementing one or more recommendations of the lifecycle rules recommendations engine, such as lifecycle rules recommendations engine 130 in FIG. 1B, as shown in example 400 in FIG. 4, the REC module, such as RFC module 700 in FIG. 7 and RFC module 115 in FIG. 1A-1B, may calculate a total ORS of '0.82'.

According to some embodiments of the present disclosure, such an improvement, as shown in example 620 from a total ORS of '0.62' to a total ORS of '0.82', may reduce the monthly cost in $1,250 which may translate to $15,000 yearly savings.

FIG. 7 is a high-level workflow of a Retention Effectiveness Calculation (REC) module 700, in accordance with some embodiments of the present disclosure. REC 700 is a REC module, such as REC module 115 in FIGS. 1A-1B.

According to some embodiments of the present disclosure, operation 710 may comprise retrieving all lifecycle-rules from the lifecycle-rules data storage, according to a tenant identification. The lifecycle-rules data storage may be a data storage, such as storage services data store 120, in FIGS. 1A-1B.

According to some embodiments of the present disclosure, operation 720 may comprise for each lifecycle-rule in the lifecycle rules data storage calculating a Rule Effectiveness Score (RES). The RES may be calculated by dividing by '3' the sum of: (i) a number of interactions-related objects access from active storage; (ii) additional interactions-related object retention in active storage; and (iii) lessen interactions-related object retention in active storage.

According to some embodiments of the present disclosure, operation 730 may comprise grouping all the calculated RES by media type.

According to some embodiments of the present disclosure, operation 740 may comprise for each media type, calculating an Object Retention Score (ORS) for the media type. The ORS may be calculated according to equation I which has been mentioned above.

According to some embodiments of the present disclosure, operation 750 may comprise dividing an aggregation of the ORS of all media types by a total number of media types to yield a total ORS for a contact center.

According to some embodiments of the present disclosure, operation 760 may comprise displaying via a display unit that is associated to the computerized system the total ORS of the contact center. For example, as shown in example 500 in FIG. 5.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized method for determining and utilizing an effectiveness of lifecycle management for storage of interactions-related objects, in a contact center, the computerized method comprising:

in a computerized system, comprising a processor, a data storage to store metadata of the interactions-related objects and a memory to store the data storage, said computerized system is communicating with a multi-tier storage in a cloud environment having a lifecycle rules data storage to store one or more lifecycle rules related to management of interactions-related objects, said processor is operating for each tenant a Retention Effectiveness Calculation (REC) module, the operating of said REC module comprising:

retrieving all lifecycle rules from the lifecycle rules data storage according to an identification of the respective tenant;

for each lifecycle rule in the lifecycle rules data storage, calculating a Rule Effectiveness Score (RES);

wherein the calculating of the RES for each lifecycle rule in the lifecycle rules data storage is performed by dividing by '3' a sum of following data points: (i) volume of interactions-related objects access from active storage; (ii) additional interactions-related object retention in active storage; and (iii) lessen interactions-related object retention in active storage, grouping all the calculated RES by related media type;

for each media type, calculating an Object Retention Score (ORS) for the media type based on the calculated RES of each lifecycle rule in the lifecycle rules data storage;

dividing an aggregation of the ORS for each media type by a total number of media types to yield a total ORS for the contact center;

configuring a display unit that is associated to the computerized system, to display the ORS of each media type, wherein the ORS of each media type and the data points are used to provide recommendations to optimize effectiveness of lifecycle management, and wherein the recommendations are displayed via the display unit, and operating a User Interface (UI) associated to an admin-web application of the multi-tier storage in the cloud environment to enable a user to set the one or more lifecycle rules according to the displayed recommendations, wherein the one or more lifecycle rules related to management of interactions-related objects include: (i) rule criteria which are defined over the metadata of the interactions-related objects; and (ii) rule actions, and
wherein the rule actions are one of: (i) transitioning the interactions-related objects from one storage class to another storage class in the multi-tier storage; and (ii) deleting the interactions-related objects;
  wherein the contact center is determined to be in a present state comprising a first lifecycle rule of the lifecycle rules having the RES above a first preconfigured threshold and the contact center having the total ORS below a second preconfigured threshold, and
  in response to determining the present state of the contact center, a recommendation to create new lifecycle rules or modify existing lifecycle rules to process the interactions-related objects that are not linked to the first lifecycle rule is added to the recommendations.

2. The computerized method of claim 1, wherein the metadata related to interactions-related objects is selected from at least one of: media type, one or more agents participating in an interaction, teams the one or more agents belong to, set of skills of the one or more agents used for routing the interaction, interaction start time, interaction duration, lifecycle rule with which the interaction is tagged, date of interaction, interaction access date, and tenant identification.

3. The computerized method of claim 1, wherein the calculating of the ORS for the media type is by using equation I:

$$ORS = \frac{\sum_{K=1}^{N} RES}{N} - \left(1 - \frac{\text{interaction volume} - \text{untagged interaction volume}}{\text{interaction volume}}\right) \quad (I)$$

whereby,
N is a total number of lifecycle rules for the media type,
RES is the RES for a lifecycle-rule,
untagged interaction volume is a total number of interactions-related objects that are not linked with any lifecycle rule, and
interaction volume is a total number of interactions-related objects for the media type.

4. The computerized method of claim 1, wherein the total ORS of the contact center is displayed on the display unit with an indication as to effectiveness of lifecycle management according to a preconfigured threshold.

5. The computerized method of claim 1, wherein the volume of interactions-related objects access from active storage is calculated by a subtraction from '1' of a subtraction of a total number of interaction-related objects accessed from a total number of interactions-related objects in active storage divided by the total number of interactions-related objects in active storage.

6. The computerized method of claim 1, wherein the additional interactions-related object retention in active storage is calculated by a subtraction from 1' of dividing a subtraction of average interactions-related object access days from active storage from retention of interactions-related objects in active storage by retention of interactions-related objects in active storage.

7. The computerized method of claim 6, wherein the average interactions-related object access days from active storage is calculated based on interaction access date retrieved from the metadata of the interactions-related objects.

8. The computerized method of claim 6, wherein the retention of interactions-related objects in active storage is derived from the date of interaction.

9. The computerized method of claim 1, wherein the lessen interactions-related object retention in active storage is calculated by a subtraction of volume of retrieved interactions divided by a sum of a volume of interactions in active storage and volume of interactions retrieved from '1'.

10. The computerized method of claim 1, wherein each media type is related to a communication channel by which an interaction has been conducted.

11. The computerized method of claim 10, wherein the communication channel is selected from at least one of: audio call, video call, chat, email and other communication channel.

12. The computerized method of claim 1, wherein the rule criteria are based on criteria selected from at least one of: (i) media type; (ii) one or more agents participating in an interaction; (iii) set of skills of the one or more agents used for routing the interaction; (iv) teams to which the one or more agents belong to; (v) Dialed Numbers (DNI).

13. The computerized method of claim 1, wherein said REC module further comprising:
  displaying, via the display unit that is associated to the computerized system, the total ORS of the contact center.

14. The computerized method of claim 1, wherein when a lifecycle rule has an RES above a first preconfigured threshold and related media type has ORS below a second preconfigured threshold, there are interactions-related objects that are not linked to a lifecycle.

15. The computerized method of claim 1, wherein when the volume of interactions-related objects access from active storage of a lifecycle rule is below a preconfigured threshold, access of interactions that are linked to the lifecycle rule is low, and wherein a recommendation of the recommendations is reduce number of interactions-related objects from active storage in the lifecycle rule.

16. The computerized method of claim 1, wherein when the additional interactions-related object retention in active storage is below a preconfigured threshold, interactions-related objects are retained in active storage and not accessed, and wherein a recommendation of the recommendations is to reduce number of days for interactions-related objects in active storage in the lifecycle rule.

17. The computerized method of claim 1, wherein when the lessen interactions-related object retention in active storage is below a preconfigured threshold, interactions-related objects are transitioned to long-term storage before they are accessed, and wherein a recommendation of the recommendations is to increase number of days for interactions-related objects in active storage in the lifecycle rule.

18. A computerized system for determining and utilizing an effectiveness of lifecycle management for storage of interactions-related objects, in a contact center, the computerized system comprising:
  a processor;
  a data storage to store metadata of the interactions-related objects;
  a memory to store the data storage,
  said computerized system is communicating with a multi-tier storage in a cloud environment having a lifecycle rules data storage to store one or more lifecycle rules related to management of interactions-related objects, said processor is operating a Retention Effectiveness Calculation (REC) module, said REC module is configured to:

retrieve all lifecycle rules from the lifecycle rules data storage according to a tenant identification;
for each lifecycle-rule in the lifecycle rules data storage, calculate a Rule Effectiveness Score (RES);
wherein the calculating of the RES for each lifecycle rule in the lifecycle rules data storage is performed by dividing by '3' a sum of following data points: (i) volume of interactions-related objects access from active storage; (ii) additional interactions-related object retention in active storage; and (iii) lessen interactions-related object retention in active storage,
group the calculated RES by related media type;
for each media type, calculate an Object Retention Score (ORS) for the media type;
divide an aggregation of the ORS for each media type by a total number of media types to yield a total ORS for the contact center;
display, via a display unit that is associated to the computerized system, the ORS of each media type;
wherein the ORS of each media type and the data points are used to provide recommendations to optimize effectiveness of lifecycle management, and
wherein the recommendations are displayed via the display unit, and
operate a User Interface (UI) associated to an admin-web application of the multi-tier storage in the cloud environment to enable a user to set the one or more lifecycle rules according to the displayed recommendations,
wherein the one or more lifecycle rules related to management of interactions-related objects include: (i) rule criteria which are defined over the metadata of the interactions-related objects; and (ii) rule actions, and
wherein the rule actions are one of: (i) transitioning the interactions-related objects from one storage class to another storage class in the multi-tier storage; and (ii) deleting the interactions-related objects;
wherein the contact center is determined to be in a present state comprising a first lifecycle rule of the lifecycle rules having the RES above a first preconfigured threshold and the contact center having the total ORS below a second preconfigured threshold, and
in response to determining the present state of the contact center, a recommendation to create new lifecycle rules or modify existing Recycle rules to process the interactions-related objects that are not linked to the first lifecycle rule is added to the recommendations.

* * * * *